Oct. 7, 1930.   L. GRILL   1,777,969
STEAM HEATED VESSEL
Filed June 5, 1928

L. Grill
INVENTOR

Patented Oct. 7, 1930

1,777,969

UNITED STATES PATENT OFFICE

LEOPOLD GRILL, OF BERNDORF, AUSTRIA, ASSIGNOR TO THE FIRM BERNDORFER METALLWARENFABRIK ARTHUR KRUPP A. G., OF BERNDORF, AUSTRIA

STEAM-HEATED VESSEL

Application filed June 5, 1928, Serial No. 283,064, and in Austria June 30, 1927.

This invention relates to heat interchangers of the kind wherein the fluid is directed towards the heat interchanging surface through perforated partitions which divide it up into jets of considerably increased velocity.

Heat interchangers of the kind referred to are known wherein the perforated partition or partitions are parallel with and at a comparatively small distance from the heat interchanging wall so that the individual jets, without being co-mingled, are caused to impinge with equal velocity against the heat interchanging surface.

The present invention consists in a double-walled cooking vessel or boiler heated by means of steam in which a single partition with fine openings is provided so as to divide the space between the two walls into two chambers only, entirely separated from each other, the heating steam on being admitted to one of the two chambers and being forced in thin jets through said openings to the other one, impinging there with the full energy of flow against the surface to be heated.

In the accompanying drawing a constructional example of a cooking vessel according to the invention is shown.

Figure 1:
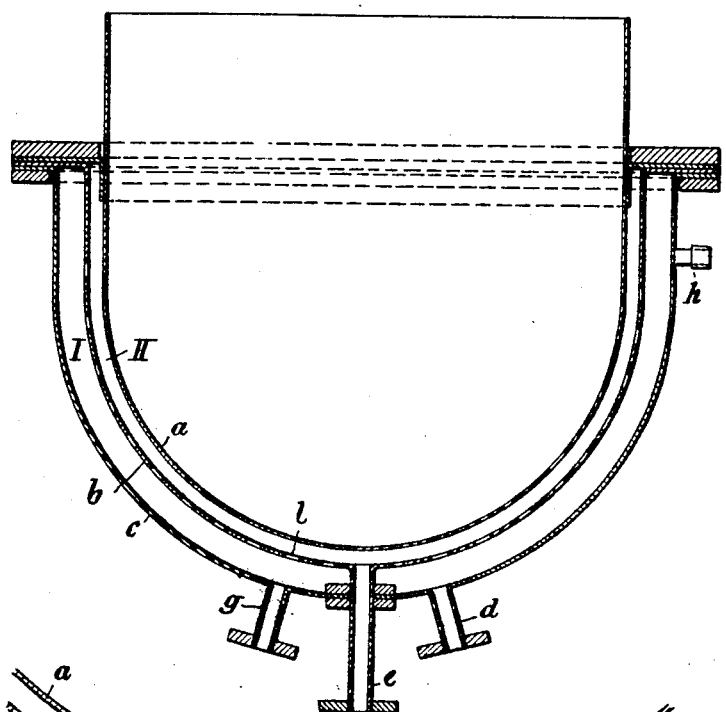
Figure 1 is a central vertical section through the vessel.
Figure 2:
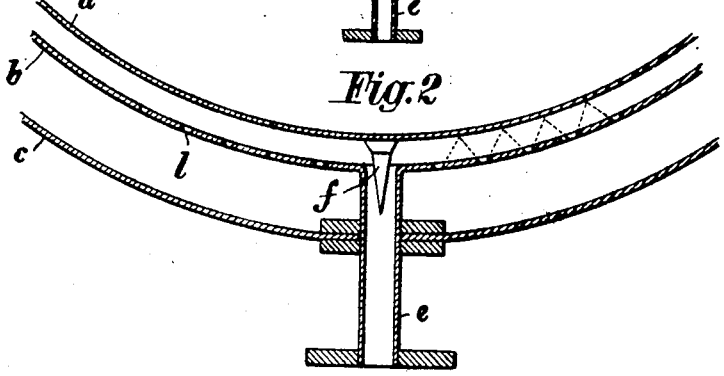
Figure 2 is a fragmentary detail sectional view of a modified construction.

In the constructional example shown in the drawing a partition is mounted in the space between the walls of a double walled vessel, which partition produces the division of the heating medium (steam) into numerous steam jets. The cooking vessel consists of an outer vessel $c$, an inner vessel $a$ forming the cooking vessel proper and a sieve-like partition $b$ provided with perforations. The latter vessel is so arranged that the part provided with perforations $l$ is at such a distance from the inner vessel $a$ that the heating effect which is dependent on the temperature and the pressure of the steam reaches a maximum.

The operation of the apparatus is as follows:—The steam which enters the outer space I through one or more branches $g$ flows through the perforations $l$ and impinges against the wall of the inner vessel $a$. Consequently it gives off its heat very rapidly to the inner vessel. The calculation of the sum of the cross sectional areas of the perforations in the intermediate partition $b$ is based on the consideration, that in the intermediate space II there must be a drop in pressure as compared with the intermediate space I. This is effected by the steam cooling against the surface to be heated. For obtaining the greatest possible heating effect, the entire heating surface of the vessel $a$ should be swept over as uniformly as possible by the conical widening steam jets. Hence, the distance between the perforations $l$ will have to be calculated according to the distances between the two vessel walls $a$ and $b$ and the difference in pressure between I and II.

It has been found, that, when using the new apparatus and when employing steam of uniform pressure and temperature, the contents of the vessel can be heated in from a third to a quarter of the time required in a boiling vessel having a double bottom of the usual construction.

The essential features of the invention are not, of course, in any way altered, if in place of fine perforations small nozzles are screwed on.

As the main condensation of the heating steam takes place in the space II, it is advisable to drain the latter, for which purposes the draining branch $e$ is provided. In order to provide that the outflow of water into the branch $e$ takes place regularly, a drop needle $f$ is provided.

What I claim is:—

1. A double-walled cooking vessel or boiler adapted to be heated by means of steam, a partition in the space between the outer and the inner walls of the vessel subdividing said space into two chambers extending throughout between the two walls and provided with a plurality of relatively small openings constituting nozzles, the heating steam on being admitted to one of the two chambers and being forced in thin jets through said openings to the other chamber, impinges there with full energy of flow against the surface of the inner wall to be heated.

2. A vessel as claimed in claim 1 characterized by the provision of a draining branch and an outflow for the water of condensation, which serves the purpose of draining the inner chamber.

3. A vessel as claimed in claim 1, characterized by the provision of a drip needle at the lowest point of the bottom of the inner wall for assisting the downward flow of the water from the bottom of the vessel.

In witness whereof I have hereunto signed my name.

ENG. LEOPOLD GRILL.